United States Patent
Sakamura et al.

(10) Patent No.: US 7,340,243 B2
(45) Date of Patent: Mar. 4, 2008

(54) CONNECTION INFORMATION MANAGEMENT SYSTEM FOR MANAGING CONNECTION INFORMATION USED IN COMMUNICATIONS BETWEEN IC CARDS

(75) Inventors: Ken Sakamura, 9-2, Osaki 4-chome, Shinagawa-ku (JP); Noboru Koshizuka, 27-20, Nishikubo 2-chome, Musashino (JP); Kazuhiko Ishii, Yokohama (JP); Kensaku Mori, Yokohama (JP); Hiroshi Aono, Yokosuka (JP); Sadayuki Hongo, Yokohama (JP)

(73) Assignees: Ken Sakamura, Tokyo (JP); Noboru Koshizuka, Musashino-shi (JP); NTT DoCoMo, Inc., Tokyo (JP)

( * ) Notice: Subject to any disclaimer, the term of this patent is extended or adjusted under 35 U.S.C. 154(b) by 588 days.

(21) Appl. No.: 10/457,521

(22) Filed: Jun. 10, 2003

(65) Prior Publication Data
US 2004/0033813 A1    Feb. 19, 2004

(30) Foreign Application Priority Data
Jun. 10, 2002    (JP)    ............... 2002-169098

(51) Int. Cl.
*H04M 1/66* (2006.01)
*H04M 1/68* (2006.01)
*H04M 3/16* (2006.01)

(52) U.S. Cl. .................. 455/411; 455/235; 455/435.1; 455/558

(58) Field of Classification Search ................ 455/235, 455/411, 435.1, 558

See application file for complete search history.

(56) References Cited

U.S. PATENT DOCUMENTS 6,289,314 B1 * 9/2001 Matsuzaki et al. ............. 705/1

(Continued)

FOREIGN PATENT DOCUMENTS

WO    WO 98/57474    12/1998

(Continued)

OTHER PUBLICATIONS

U.S. Appl. No. 10/457,525, filed Jun. 10, 2003, Sakamura et al.

(Continued)

*Primary Examiner*—Nay Maung
*Assistant Examiner*—Janelle N. Young
(74) *Attorney, Agent, or Firm*—Oblon, Spivak, McClelland, Maier & Neustadt, P.C.

(57) ABSTRACT

Each IC card 1 notifies a server 3 of the ID of the IC card and the connection information of a terminal device to which the IC card is connected. The server 3 stores the ID and the connection information in a database 4 while associating the ID and the connection information with each other. When an IC card 1 communicates with another IC card, the IC card 1 requests the connection information concerning the destination IC card from the server 3 while specifying the ID of this IC card. The server 3 searches the database 4 for the connection information corresponding to the ID specified by the request, and notifies the requesting IC card 1 of the acquired connection information. This enables communications between IC cards even if the terminal device to which a destination IC card is connected has been changed in the past.

7 Claims, 4 Drawing Sheets

U.S. PATENT DOCUMENTS

| | | | |
|---|---|---|---|
| 6,394,341 B1* | 5/2002 | Makipaa et al. | 235/379 |
| 6,445,914 B1* | 9/2002 | Findikli et al. | 455/411 |
| 6,466,804 B1* | 10/2002 | Pecen et al. | 455/558 |
| 6,484,026 B1* | 11/2002 | Hagebarth | 455/419 |
| 6,591,116 B1* | 7/2003 | Laurila et al. | 455/558 |
| 6,704,789 B1* | 3/2004 | Ala-Laurila et al. | 709/230 |
| 6,792,280 B1* | 9/2004 | Hori et al. | 455/517 |
| 2001/0039204 A1* | 11/2001 | Tanskanen | 463/17 |
| 2001/0046839 A1* | 11/2001 | Latva-Aho et al. | 455/3.05 |
| 2002/0085511 A1* | 7/2002 | Koponen et al. | 370/315 |
| 2002/0124092 A1* | 9/2002 | Urien | 709/229 |

FOREIGN PATENT DOCUMENTS

WO    WO 01/60026    8/2001

OTHER PUBLICATIONS

U.S. Appl. No. 10/457,521, filed Jun. 10, 2003, Sakamura et al.

* cited by examiner

CONNECTION INFORMATION MANAGEMENT SYSTEM FOR MANAGING CONNECTION INFORMATION USED IN COMMUNICATIONS BETWEEN IC CARDS

CROSS-REFERENCE TO RELATED APPLICATIONS

This application is based upon and claims the benefit of priority from Japanese Patent Application No. 2002-169098 filed Jun. 10, 2002; the entire contents of which are incorporated herein by reference.

BACKGROUND OF THE INVENTION

1. Field of the Invention

The present invention relates to a connection information management system and a connection information management method for managing connection information used in communications between IC cards. The present invention also relates to an IC card for use in the foregoing connection information management system and connection information management method.

2. Description of Related Art

In recent years, IC cards having unique IDs have rapidly become popular. In general, an IC card is inserted into a predetermined slot of a cellular phone or connected to a personal computer, which is connected to the Internet, by the user thereof. Thus, the IC card can communicate with other IC cards, which are similarly connected to other cellular phones, personal computers or the like.

For example, when an IC card is inserted into a slot of a cellular phone, communication using phone numbers is performed. On the other hand, when an IC card is connected to a personal computer, communication using IP addresses is performed. In order to enable such communication between IC cards, terminal devices, such as cellular phones and personal computers, to which IC cards are connected, are designed so that connection information, such as phone numbers and the IP addresses of terminal devices to which other IC cards are connected, is registered in advance.

However, such IC cards have the following problem: when a terminal device having another IC card connected thereto has been changed to another terminal device having different connection information by the user of the other IC card, communication can no longer be performed by using the connection information previously registered for the other IC card.

To cope with this problem, it is considered that each IC card notifies a server of the connection information of a terminal device currently having the IC card connected thereto and that the connection information is managed in the server. However, in the case where an IC card cannot communicate with the server because the IC card is located outside the wireless communication service area and so on, there arises a problem that the connection information of the IC card cannot be managed in the server.

SUMMARY OF THE INVENTION

An object of the present invention is to provide a connection information management system and a connection information management method in which the connection information of a terminal device having an IC card connected thereto can be managed in a server even if the IC card cannot communicate with the server.

A first aspect of the present invention is a connection information management system for managing connection information used in communications between IC cards. Each IC card comprises: a first notification unit configured to notify another IC card of the ID of the IC card and connection information of a terminal device having the IC card connected thereto; an acceptance unit configured to accept notification concerning the ID of the other IC card and connection information of a terminal device having the other IC card connected thereto from the other IC card; and a second notification unit configured to notify a server of the ID and the connection information through a network. The server comprises: an acceptance unit configured to accept notification of the ID and the connection information; and a database configured to store the accepted ID and connection information while associating the ID and the connection information with each other.

In the present aspect, when an IC card is notified of the ID and the connection information by another IC card, the IC card notifies the server of the ID and the connection information. Thus, even if the other IC card is in a state where it cannot directly communicate with the server, the ID and the connection information concerning the other IC card can be managed in the server.

Herein, a "terminal device" means a cellular phone, a personal computer, or the like, which can connect to a network in a state where an IC card is connected thereto. Moreover, "networks" include telephone networks, the Internet, and the like, including wired and wireless networks.

A second aspect of the present invention is a connection information management method for managing connection information used in communications between IC cards. Each IC card executes the steps of: notifying another IC card of the ID of the IC card and connection information of a terminal device having the IC card connected thereto; accepting notification of the ID of the other IC card and connection information of a terminal device having the other IC card connected thereto from the other IC card; and notifying a server of the ID and the connection information through a network. The server executes the steps of: accepting notification of the ID and the connection information; and storing the accepted ID and connection information while associating the ID and the connection information with each other.

Another object of the present invention is to provide an IC card for use in the above-described connection information management system and connection information management method.

A third aspect of the present invention is an IC card to be connected to a terminal device capable of communicating with a server through a network. The IC card comprises: a first notification unit configured to notify another IC card of the ID of the IC card and connection information of a terminal device having the IC card connected thereto; an acceptance unit configured to accept notification concerning the ID of the other IC card and connection information of a terminal device having the other IC card connected thereto from the other IC card; and a second notification unit configured to notify the server of the ID and the connection information through the network.

The above-described IC card may further comprise an authentication unit configured to perform mutual authentication with the other IC card. In this case, the first notification unit notifies the ID and the connection information after the mutual authentication with the other IC card.

In the present aspect, when IC cards notify each other of the ID and the connection information, the IC cards perform mutual authentication, thereby making it possible to prevent the ID and the connection information from being notified by a forged IC card.

The above-described IC card may further comprise: an authentication unit configured to perform mutual authentication with the server. In this case, the second notification unit notifies the ID and the connection information after the mutual authentication with the server.

In the present aspect, when the IC card notifies the server of the ID and the connection information, the IC card and the server perform mutual authentication, thus preventing the ID and connection information notified by a forged IC card from being stored in the server.

The above-described IC card may further comprise: a request unit configured to request, from the server, connection information of a terminal device having other IC card connected thereto while specifying the ID of the other IC card; and an acquisition unit configured to acquire the requested connection information from the server.

In the present aspect, when an IC card communicates with another IC card, the IC card requests from the server the connection information of a terminal device having the destination IC card connected thereto while specifying the ID of the destination IC card, thus acquiring the current connection information of the destination. This enables the IC card to communicate with the destination IC card by using the acquired connection information even if the terminal device having the destination IC card connected thereto has been changed in the past.

The above-described IC card may further comprise an authentication unit configured to perform mutual authentication with the server. In this case, the request unit requests the connection information after the mutual authentication with the server.

In the present aspect, when the IC card requests the ID and the connection information concerning the destination IC card from the server, the IC card and the server perform mutual authentication, thereby making it possible to prevent the ID and the connection information from leaking to a forged IC card.

In the above-described IC card, the connection information contains at least the network number of the terminal device.

In the present aspect, the connection information contains the network number of the terminal device as the minimum information required for the IC card to communicate with another IC card. Herein, "network number" means a phone number, an IP address, or the like, which is information used for the communication links between terminal devices.

As a desirable aspect of the invention, the above-described server may further comprise an authentication unit configured to perform mutual authentication with the IC card, wherein the acceptance unit accept the notification after the mutual authentication with the IC card.

The above-described server may further include: a search unit configured to search the connection information stored in the database for the connection information corresponding to the ID specified by a request when an IC card has made the request for the connection information of the terminal device having another IC card connected thereto while specifying the ID of the other IC card; and a notification unit configured to notify the requesting IC card of the search-acquired connection information.

The above-described server may further include an authentication unit configured to perform mutual authentication with the IC card. In this case, the server accepts the request for the connection information after the mutual authentication with the IC card.

In the above-described server, the connection information contains at least the network number of the terminal device.

DETAILED DESCRIPTION OF EMBODIMENT

Figure 1:
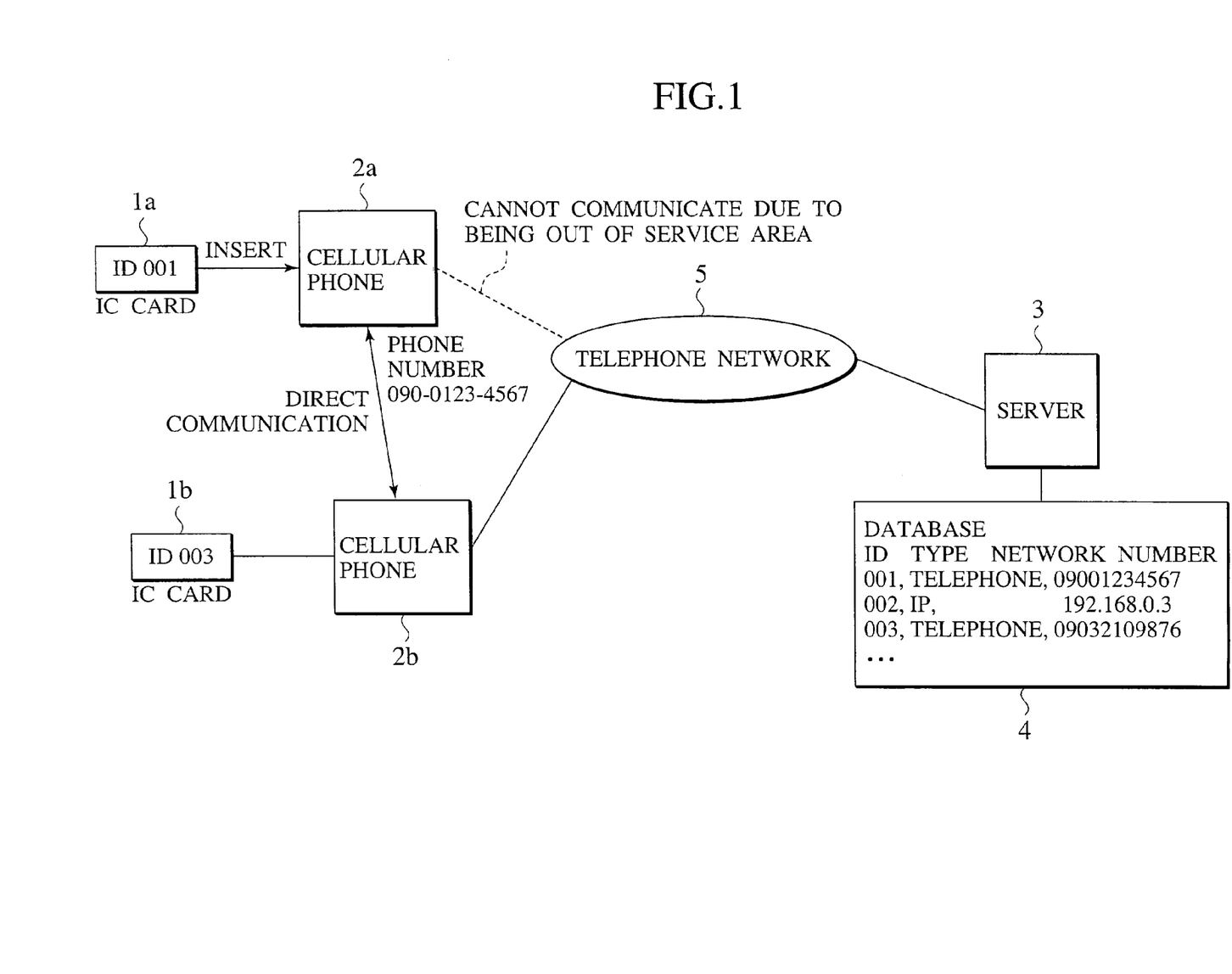
FIG. 1 is a block diagram showing the configuration of a connection information management system for IC cards, according to one embodiment.

As shown in the block diagram of FIG. 1, in a connection information management system for IC cards according to one embodiment, an IC card 1a having the ID of 001 is inserted into a predetermined slot of a cellular phone 2a, and an IC card 1b having the ID of 003 is inserted into a predetermined slot of a cellular phone 2b. The cellular phones 2a and 2b are connected to a telephone network 5 through wireless communications, and a server 3 is connected to the telephone network 5 through, for example, a telephone line.

Figure 2:
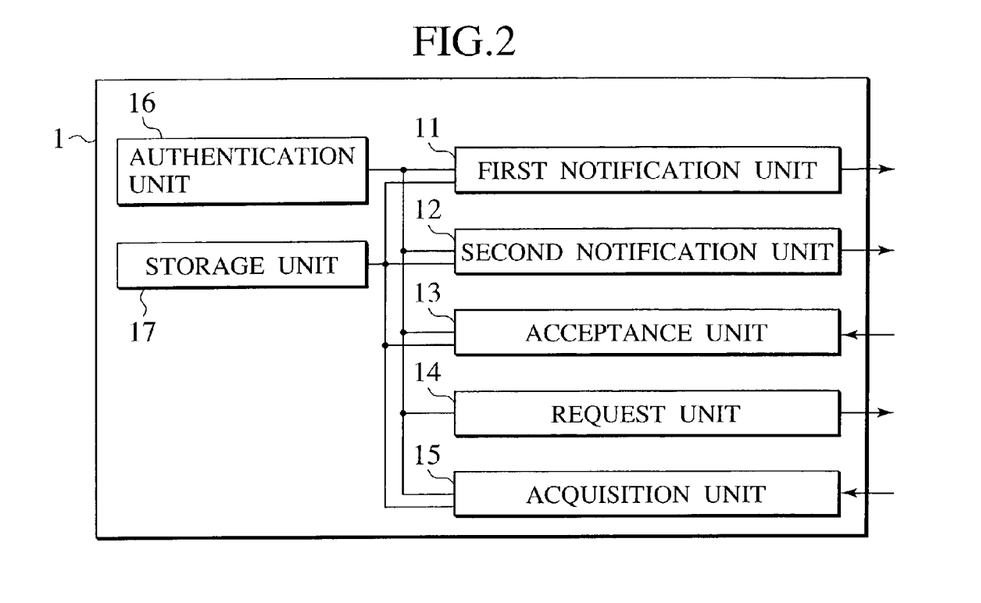
FIG. 2 is a function block diagram showing the configuration of the main part of an IC card shown in FIG. 1.

An IC card 1 communicates, through a cellular phone 2 having the IC card 1 connected thereto, with another IC card connected to another cellular phone or a personal computer. As shown in the function block diagram of FIG. 2, an IC card 1 has a first notification unit 11, a second notification unit 12, an acceptance unit 13, a request unit 14, an acquisition unit 15, an authentication unit 16, and a storage unit 17 in the main part thereof. The first notification unit 11 notifies another IC card of the ID of the IC card 1 and the connection information of a cellular phone 2 having the IC card 1 connected thereto. The acceptance unit 13 accepts the notification concerning the ID of the other IC card and the connection information of a terminal device, such as a cellular phone or a personal computer, to which the other IC card is connected, from the other IC card. Further, the acceptance unit 13 accepts the notification of the connection information of the cellular phone 2 having the IC card 1 connected thereto, from the cellular phone 2. The second notification unit 12 notifies the server 3 of the ID and the connection information through the telephone network 5. The request unit 14 requests from the server 3 the connection information of a terminal device having another IC card connected thereto while specifying the ID of the other IC card. The acquisition unit 15 acquires the connection information requested by the request unit 14 from the server 3. The authentication unit 16 performs mutual authentication with the other IC card or the server 3. The storage unit 17 stores the ID and the connection information. Herein, connection information is assumed to contain the phone number of a cellular phone 2. Note that the process in each unit may be executed by a dedicated LSI or may be executed by a program downloaded to a predetermined built-in memory.

Figure 3:
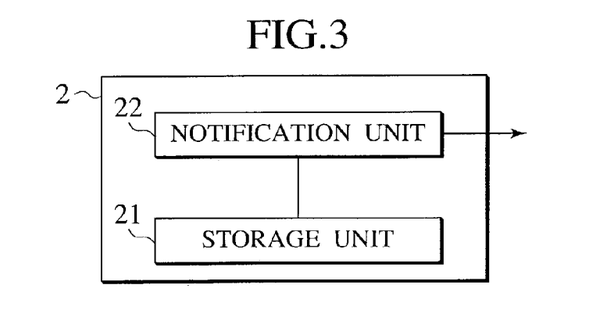
FIG. 3 is a function block diagram showing the configuration of the main part of the server shown in FIG. 1.

As shown in the function block diagram of FIG. 3, a cellular phone 2 has a storage unit 21 and a notification unit 22 in the main part thereof. The storage unit 21 stores the IDs of IC cards and the connection information of terminal devices. The notification unit 22 reads out the connection information of the cellular phone 2 and the ID of a destination IC card from the storage unit to notify an IC card 1 connected to the cellular phone 2. The process in each unit may be executed by a dedicated LSI or may be executed by a program downloaded to a predetermined built-in memory.

Figure 4:
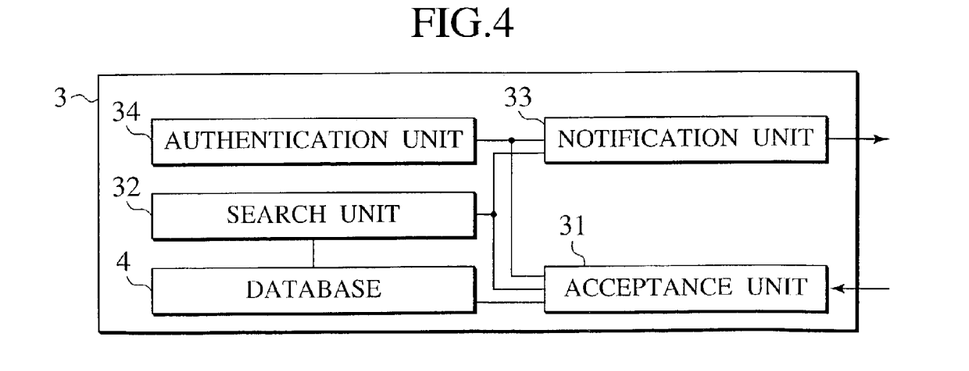
FIG. 4 is a function block diagram showing the configuration of the main part of a terminal device shown in FIG. 1.

As shown in the function block diagram of FIG. 4, the server 3 has an acceptance unit 31, a search unit 32, a notification unit 33, and an authentication unit 34, and a database 4 in the main part thereof. The acceptance unit 31 accepts the notification of the ID and connection information from an IC card 1. The database 4 stores the ID and the connection information accepted by the acceptance unit 31 while associating the ID and the connection information with each other. When an IC card 1 has requested the connection information of a terminal device having another IC card connected thereto while specifying the ID of the other IC card, the search unit 32 searches the connection information stored in the database 4 for the connection information corresponding to the ID. The notification unit 33 notifies the requesting IC card 1 of the connection information searched by the search unit 31. The authentication unit 34 performs mutual authentication with the IC card 1. The server 3 is constituted of, for example, a computing machine. A program executes the process in each unit.

Next, an example of the process executed when an IC card 1 causes the server 3 to store the ID and the connection information will be described using FIG. 5. Prior to this process, the cellular phone 2a notifies the IC card 1a of the connection information of the cellular phone 2a in advance. Similarly, the cellular phone 2b also notifies the IC card 1b of the connection information of the cellular phone 2b in advance.

Figure 5:
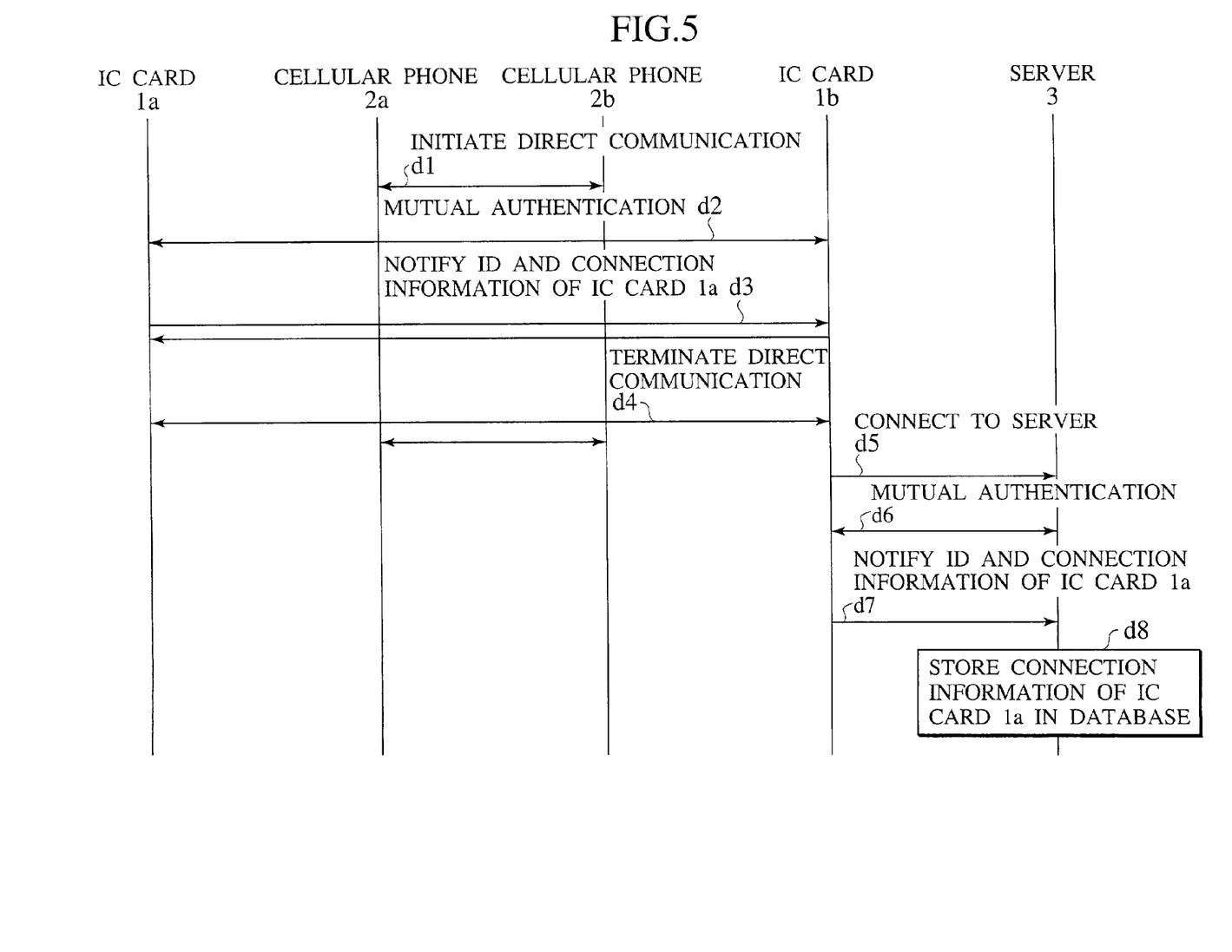
FIG. 5 is a timing chart showing an example of the process for storing the ID of an IC card and the connection information of a terminal device in the server.

In the process shown in FIG. 5, first, the cellular phones 2a and 2b initiate direct communication in order to perform some sort of essential communication (d1). These direct communication use, for example, infrared light. Subsequently, the IC cards 1a and 1b perform mutual authentication, and confirm that the party on the other end is a managed object and not a forged IC card (d2).

For this process of mutual authentication, for example, a technology called PKI is used. In this technology, certification information issued by a predetermined issuer is registered in the IC card 1 and the server 3 individually, and the IC card 1 and the server 3 authenticate each other by comparing these pieces of certification information.

After mutual authentication, the IC card 1a notifies the IC card 1b of the ID of the IC card 1a and the connection information of the cellular phone 2a (d3). Similarly, the IC card 1b also notifies the IC card 1a of the ID of the IC card 1b and the connection information of the cellular phone 2b. Then, after the IC cards 1a and 1b have performed essential communication, communication between both IC cards 1a and 1b is terminated, and direct communication between the cellular phones 2a and 2b is terminated (d4).

Thereafter, one IC card 1 capable of communicating with the server 3 executes the process for notifying the server 3 of the ID and the connection information accepted from the other IC card. Hereinafter, as an example, a description will be given of the case where the IC card 1a cannot communicate with the server 3 because the cellular phone 1a is located outside the service area and where only the IC card 1b can communicate with the server 3, as shown in FIG. 1.

The IC card 1b establishes a communication link to the server 3 (d5) and performs mutual authentication with the server 3 (d6). In this process for mutual authentication, for example, the certification information issued by a predetermined issuer is also registered in the server 3, and a process similar to that of d2 is executed. After mutual authentication, the IC card 1b notifies the server 3 of the ID and the connection information concerning the IC card 1a on behalf of the IC card 1a (d7). Moreover, the IC card 1b also notifies the server 3 of its own ID and connection information by executing a process similar to that of d5 to d7 in advance.

The server 3 stores the ID and the connection information concerning the IC card 1a, which have been transmitted from the IC card 1b, in the database 4 while associating the ID and the connection information with each other (d8). Moreover, when the server 3 has received the ID and the connection information concerning the IC card 1b directly from the IC card 1b, the server 3 also stores the ID and the connection information in the database 4 while associating them with each other. At this time, if the connection information concerning an IC card is stored for the first time, registration is carried out. On the other hand, if it is stored for the second time or more, an update is made. The above-described processes of d1 to d8 are executed for all IC cards 1 connected to the telephone network 5.

Figure 6:
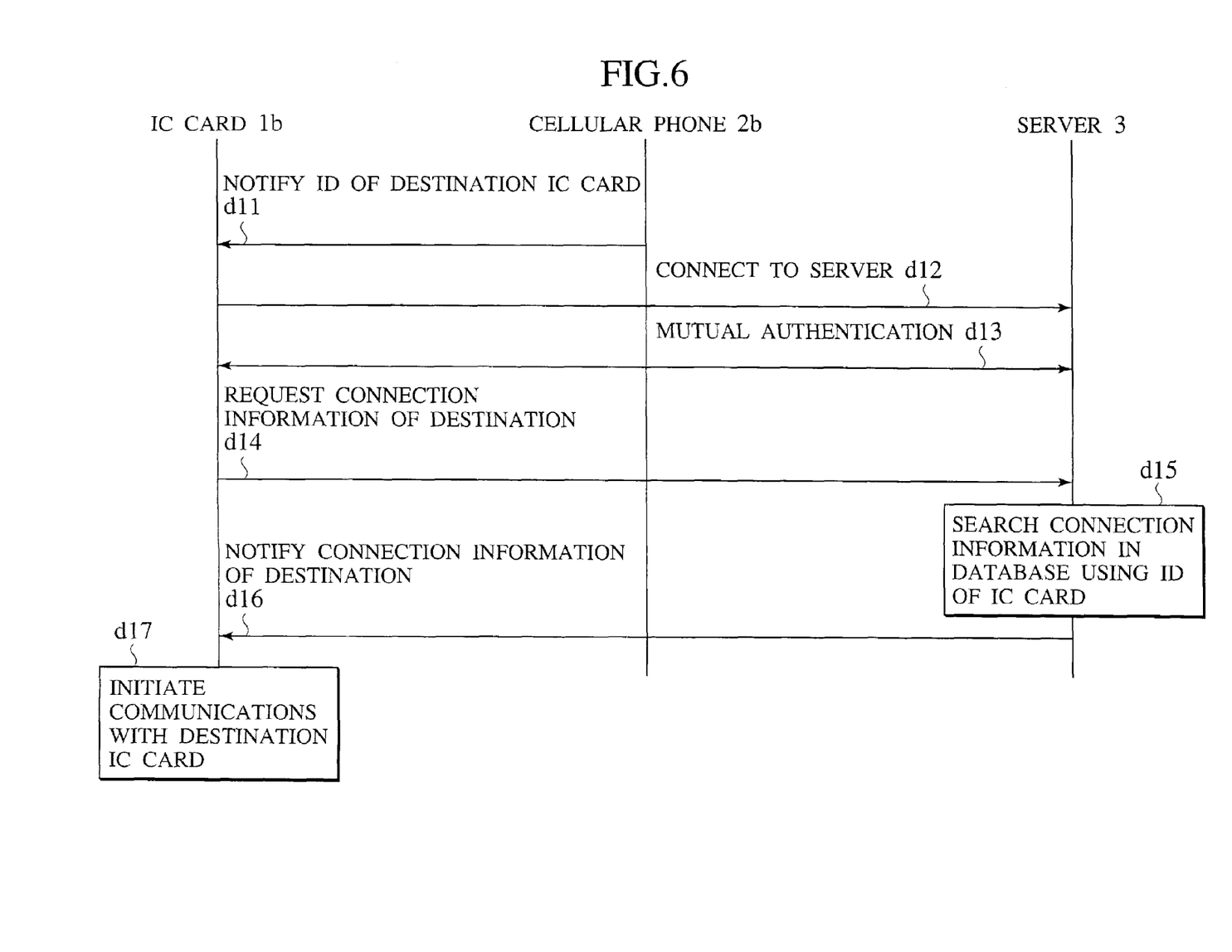
FIG. 6 is a timing chart showing an example of the process executed when an IC card communicates with another IC card.

Next, an example of the process executed when the IC card 1b communicates with another IC card will be described using FIG. 6.

The cellular phone 2b notifies the IC card 1b of the ID of the destination IC card, which is stored therein in advance (d11).

The IC card 1b, which has received the ID, connects to the server 3 (d12) and performs mutual authentication with the server 3 (d13). The processes of d12 and d13 are executed similarly to the process of d5 and d6 shown in FIG. 5.

After mutual authentication, the IC card 1b requests from the server 3 the connection information of a terminal device having the destination IC card connected thereto while specifying the ID of the destination IC card (d14).

The server 3 searches the connection information stored in the database 4 for the connection information corresponding to the ID specified at the time of the request (d15). Then, the server 3 notifies the requesting IC card 1b of the search-acquired connection information (d16).

The IC card 1b initiates communication with the destination IC card using the accepted connection information (d17).

As described above, in the present embodiment, the IC cards 1a and 1b notify each other of the IDs and the connection information, and one IC card 1 capable of connecting to the server 3 notifies the server 3 of the ID and the connection information concerning the other IC card. Thus, even when an IC card is in a state where it cannot directly communicate with the server, the ID and the connection information concerning the IC card can be managed in the server 3.

According to the present embodiment, when the IC cards 1a and 1b notify each other of the IDs and the connection information, the IC cards perform mutual authentication, thereby making it possible to prevent an ID and connection information from being notified by a forged IC card.

According to the present embodiment, when an IC card 1 notifies the server 3 of the ID and the connection information, the IC card 1 and the server 3 perform mutual authentication, thus preventing an ID and connection information notified by a forged IC card from being stored in the server 3.

According to the present embodiment, the ID and the connection information of each IC card 1 are associated with each other to be stored in the database 4 by the server 3. When an IC card 1 communicates with another IC card, the IC card 1 requests the connection information of the destination from the server 3 while specifying the ID of the destination IC card. This enables the IC card 1 to communicate with the destination IC card by using the acquired current connection information even if the terminal device having the destination IC card connected thereto has been changed in the past.

According to the present embodiment, when an IC card 1 requests the connection information of a destination from the server 3, the IC card 1 and the server 3 perform mutual authentication, thereby making it possible to prevent the connection information from leaking to a forged IC card.

Incidentally, in the present embodiment, the telephone network 5 has been used as an example of a network to which the server 3 is connected. However, a network to which the server 3 is connected is not limited to this. For example, the server 3 may be connected to the Internet or may be connected to both of a telephone network and the Internet. In the case where the server 3 is connected to a plurality of networks, connection information may further contain a network type, which indicates different kinds of network such as a telephone network or the Internet.

What is claimed is:

1. A connection information management system for managing connection information used in communications among IC cards,
    wherein each IC card comprises:
    a first notification unit configured to notify another IC card of the ID of the IC card and connection information of a terminal device having the IC card connected thereto;
    an acceptance unit configured to accept notification concerning the ID of the another IC card and connection information of a terminal device having the another IC card connected thereto from the another IC card;
    a second notification unit configured to notify a server of the ID and the connection information of the another IC card through a network after communication is terminated between the IC card and the another IC card;
    a request unit configured to request from the server, connection information of a terminal device having the another IC card connected thereto while specifying the ID of the another IC card prior to establishing data communication between the IC card and the another IC card; and
    an acquisition unit configured to acquire the requested connection information from the server, and
    wherein the server comprises:
    an acceptance unit configured to accept notification of the ID and the connection information of the another IC card;
    a database configured to store the accepted ID and connection information of the another IC card while associating the ID and the connection information with each other;
    a search unit configured to search the connection information stored in the database for the connection information corresponding to the ID specified by the request from the requesting IC card; and
    a notification unit configured to notify the requesting IC card of the search acquired connection information.

2. A connection information management method for managing connection information used in communications among IC cards,
    wherein each IC card executes the steps of:
    notifying another IC card of the ID of the IC card and connection information of a terminal device having the IC card connected thereto;
    accepting notification of the ID of the another IC card and connection information of a terminal device having the other IC card connected thereto from the another IC card;
    notifying a server of the ID and the connection information through a network of the another IC card after communication is terminated between the IC card and the another IC card;
    requesting from the server, connection information of a terminal device having the another IC card connected thereto while specifying the another ID of the other IC card prior to establishing data communication between the IC card and the another IC card; and
    acquiring the requested connection information from the server, and
    wherein the server executes the steps of:
    accepting notification of the ID and the connection information of the another IC card; and
    storing the accepted ID and connection information of the another IC card while associating the ID and the connection information with each other;
    searching the connection information stored in the database for the connection information corresponding to the ID specified by the request from the requesting IC card; and
    notifying the requesting IC card of the search acquired connection information.

3. An IC card to be connected to a terminal device capable of communicating with a server through a network, the IC card comprising:
    a first notification unit configured to notify another IC card of the ID of the IC card and connection information of a terminal device having the IC card connected thereto;
    an acceptance unit configured to accept notification concerning the ID of the another IC card and connection information of a terminal device having the another IC card connected thereto from the another IC card;
    a second notification unit configured to notify the server of the ID and the connection information of the another IC card through the network after communication is terminated between the IC card and the another IC card;
    a request unit configured to request, from the server, connection information of a terminal device having the another IC card connected thereto while specifying the ID of the another IC card prior to establishing data communication between the IC card and the another IC card; and
    an acquisition unit configured to acquire the requested connection information from the server.

4. The IC card of claim 3, further comprising:
    an authentication unit configured to perform mutual authentication with the another IC card,
    wherein the first notification unit notifies the ID and the connection information of the another IC card after the mutual authentication with the other IC card.

5. The IC card of claim 3, further comprising:
an authentication unit configured to perform mutual authentication with the server,
wherein the second notification unit notifies the ID and the connection information of the another IC card after the mutual authentication with the server.

6. The IC card of claim 3, further comprising:
an authentication unit configured to perform mutual authentication with the server,
wherein the request unit requests the connection information after the mutual authentication with the server.

7. The IC card of claim 3,
wherein the connection information contains at least the network number of the terminal device.

* * * * *